United States Patent
Sinykin et al.

(10) Patent No.: US 8,589,722 B2
(45) Date of Patent: Nov. 19, 2013

(54) METHODS AND STRUCTURE FOR STORING ERRORS FOR ERROR RECOVERY IN A HARDWARE CONTROLLER

(75) Inventors: Joshua P. Sinykin, Shrewsbury, MA (US); Sreedeepti Reddy, Colorado Springs, CO (US); Jeffrey K. Whitt, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 275 days.

(21) Appl. No.: 13/103,623

(22) Filed: May 9, 2011

(65) Prior Publication Data

US 2012/0290875 A1 Nov. 15, 2012

(51) Int. Cl.
*G06F 11/00* (2006.01)

(52) U.S. Cl.
USPC .................................. 714/4.1; 714/2

(58) Field of Classification Search
USPC ................ 714/4.1, 2, 15, 16, 20, 25, 47.1, 48
See application file for complete search history.

(56) References Cited

U.S. PATENT DOCUMENTS

| | | | |
|---|---|---|---|
| 5,325,520 A * | 6/1994 | Nguyen et al. | 714/17 |
| 5,864,656 A * | 1/1999 | Park | 714/10 |
| 6,996,670 B2 | 2/2006 | Delaire et al. | |
| 7,219,144 B2 | 5/2007 | Matsuki et al. | |
| 7,447,934 B2 * | 11/2008 | Dasari et al. | 714/5.11 |
| 2002/0184576 A1 * | 12/2002 | Arndt et al. | 714/48 |
| 2004/0054776 A1 | 3/2004 | Klotz et al. | |
| 2004/0057389 A1 | 3/2004 | Klotz et al. | |
| 2004/0059807 A1 | 3/2004 | Klotz | |
| 2004/0078397 A1 * | 4/2004 | Mehta et al. | 707/202 |
| 2004/0153863 A1 | 8/2004 | Klotz | |
| 2005/0060574 A1 | 3/2005 | Klotz | |
| 2005/0060598 A1 | 3/2005 | Klotz | |
| 2005/0076113 A1 | 4/2005 | Klotz et al. | |
| 2007/0174517 A1 | 7/2007 | Robillard et al. | |
| 2008/0239942 A1 * | 10/2008 | Hsu et al. | 370/216 |
| 2010/0262685 A1 | 10/2010 | Dale | |
| 2010/0318700 A1 | 12/2010 | Rangan et al. | |
| 2011/0072209 A1 | 3/2011 | Lund et al. | |

* cited by examiner

*Primary Examiner* — Dieu-Minh Le
(74) *Attorney, Agent, or Firm* — Duft Bornsen & Fettig, LLP; Gregory T. Fettig

(57) ABSTRACT

Methods and structure for providing methods and structure for recovering errors in a hardware controller after an overwrite event, such as the detection of another error. In this regard, a link layer of the hardware controller is configured with a register that persistently stores errors until a processor can address them. The link layer is adapted to establish a connection between an initiator and a target and detect errors associated with the connection. As each detected error is overwritten by a subsequently detected error, the link layer register persistently stores the detected errors associated with the connection for recovery after the detected error has been overwritten in the link layer at least until the error can be handled.

20 Claims, 5 Drawing Sheets

METHODS AND STRUCTURE FOR STORING ERRORS FOR ERROR RECOVERY IN A HARDWARE CONTROLLER

BACKGROUND

1. Field of the Invention

The invention relates generally to hardware controllers and more specifically to methods and structures for persistently storing errors during overwrite events for error recovery.

2. Discussion of Related Art

Hardware controllers establish connections between devices and maintain those connections to ensure that Input/Output (I/O) requests from one device to another are properly conveyed. An example of such occurs in storage area networks, where storage controllers process commands between initiators (e.g., host systems) and target devices (e.g., storage devices or expanders). The initiators are typically connected to the storage controller by a data transport medium (e.g., Fibre Channel transport medium) and the target devices are connected to the initiators by another data transport medium (e.g., a SCSI transport medium). Once connected, the different transport mediums and the various layers thereof (e.g., link layer, PHY layer, etc.) allow an initiator to communicate and exchange data with the target device.

This form of layered communications between initiators and targets has developed to provide reliable high-speed communications. However, errors can still occur and, in many instances, it is difficult if not impossible to assess the cause of an error or other issue because the flow of information in the storage controller can be particularly heavy at times. This is generally due to the fact that hardware controllers overwrite error information when another error is detected.

Because error information is not maintained in a hardware controller, the conditions under which the error occurred (e.g., hardware, software, and/or load conditions) generally need to be replicated. Then, the hardware controller is monitored to determine the cause of the error. This relies on the assumption that the error will even occur under the replicated conditions. And, replication of the conditions can be time consuming and costly. The replication process also generally results in down time for the hardware controller because it is removed from its typical operations. Hence, there is exists a need to simplify the recovery of errors in a hardware controller.

SUMMARY

The present invention addresses the above and other problems, thereby advancing the state of the useful arts, by providing methods and structure for recovering errors in a hardware controller after an overwrite event, such as the detection of another error. In doing so, the hardware controller configures a link layer of the hardware controller with a register that persistently stores errors until a processor can address them. In one aspect thereof, a hardware controller includes a link layer adapted to establish a connection between an initiator (e.g., a host system) and a target (e.g., a storage device) and detect errors associated with the connection. Each detected error is overwritten by a subsequently detected error. The hardware controller also includes a processor adapted to transfer input/output requests to the target through the link layer. The link layer comprises a register adapted to persistently store the detected errors associated with the connection between the initiator and the target for recovery of a detected error after the detected error has been overwritten in the link layer.

The processor may be further adapted to determine whether a persistently stored error is a connection attempt error or a critical error and to pause input/output requests to the target upon determining that the persistently stored error is a critical error until the critical error is corrected. The processor may be further adapted to determine a current state of the connection between the initiator and the target. Some examples of the connection to the target include a Small Computer System Interface protocol connection, a Serial Attached Small Computer System Interface protocol connection, or a Serial Advanced Technology Attachment protocol connection.

In one aspect hereof, a method and a computer-readable medium are operable to provide error recovery in a hardware controller. The method includes detecting at least two errors associated with a connection between the hardware controller and a target and storing information pertaining to the errors in a link layer register of the hardware controller. The method also includes accessing the link layer register to address the errors and deleting the error information of an error in the link layer register in response to addressing the error. The method may further include determining whether the error pertains to a critical event. The method may further include, in response to determining that the error pertains to a critical event, pausing I/O requests to the target determining a cause of the error. The method may also include correcting the error continuing to detect errors during the connection between the target and the hardware controller.

DETAILED DESCRIPTION OF THE DRAWINGS

Figure 1:
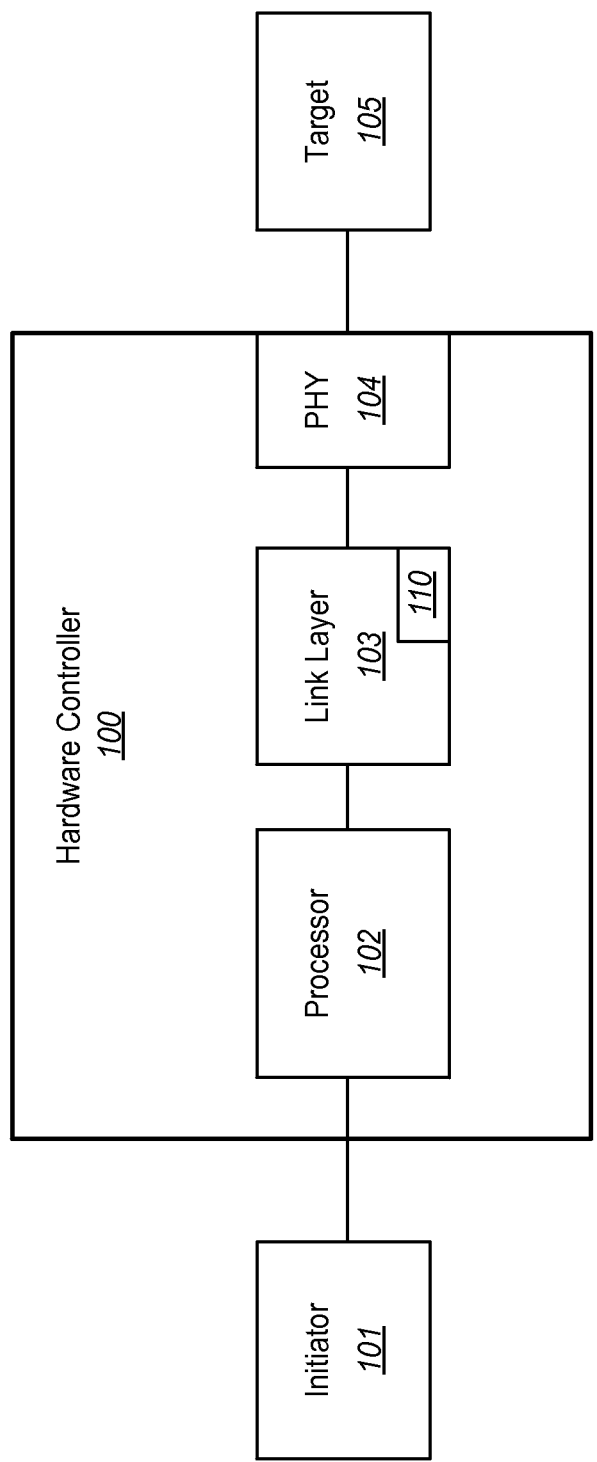
FIG. 1 is a block diagram of an exemplary hardware controller enhanced in accordance with features and aspects hereof to provide error recovery.

FIG. 1 is a block diagram of an exemplary hardware controller 100 enhanced in accordance with features and aspects hereof to provide error recovery. The hardware controller 100 includes a processor 102 to control Input/Output (I/O) requests from an initiator 101 to a target 105. In this regard, the initiator may transfer an I/O request to the hardware controller 100 for processing. The hardware controller 100, in turn, processes the I/O request in accordance with the connection type of the target 105. Examples of various connection types to the target 105 are shown and described in greater detail below.

The hardware controller 100 also includes a PHY layer 104 that is operable to control signaling and speed negotiation through a physical layer (e.g., a connector). The PHY layer 104 generally controls encoding (e.g., 8b10b encoding from bits to dwords), out of band signaling, and speed negotiation between the initiator 101 and the target 105. The hardware controller 100 also includes a link layer 103 that is operable to establish a connection with the target 105 through the PHY 104.

The link layer 103 is any hardware, firmware, software, or combination thereof, operable to establish and control the connections to the target 105 through the PHY layer 104. The link layer 103 may also control primitives, clock skew management, cyclic redundancy checks (CRC), scrambling, bit order processing, address frames, identification and hard reset sequences, and connection management state machines.

The link layer 103 may detect errors associated with the connection with the target 105. For example, the link layer 103 may detect errors during the communication between the hardware controller 100 and the target 105. When the error is detected, the processor 102 addresses the error to either correct the problem or deem the error as noncritical. Previously, once an error was detected, a subsequent error would overwrite the detected error (i.e., an "overwrite event"). If the processor 102 did not address the previously detected error in time, the information pertaining to the detected error would be lost, resulting in debugging of the problem and potential data corruption if the error is not corrected. The hardware controller 100 enhanced in accordance with features and aspects hereof overcomes the problems associated with the lost errors by providing persistent storage for errors and the associated information. The hardware controller 100 incorporates a register 110 into the link layer 103 to persistently record errors associated with the connection between the hardware controller 100 and the target 105. That is, while the link layer 103 may overwrite errors with subsequently detected errors, the register 110 stores the errors and any information pertinent to the errors such that the processor 102 may address them when it is convenient and maintain the connection between the hardware controller 100 and the target 105.

Figure 2:
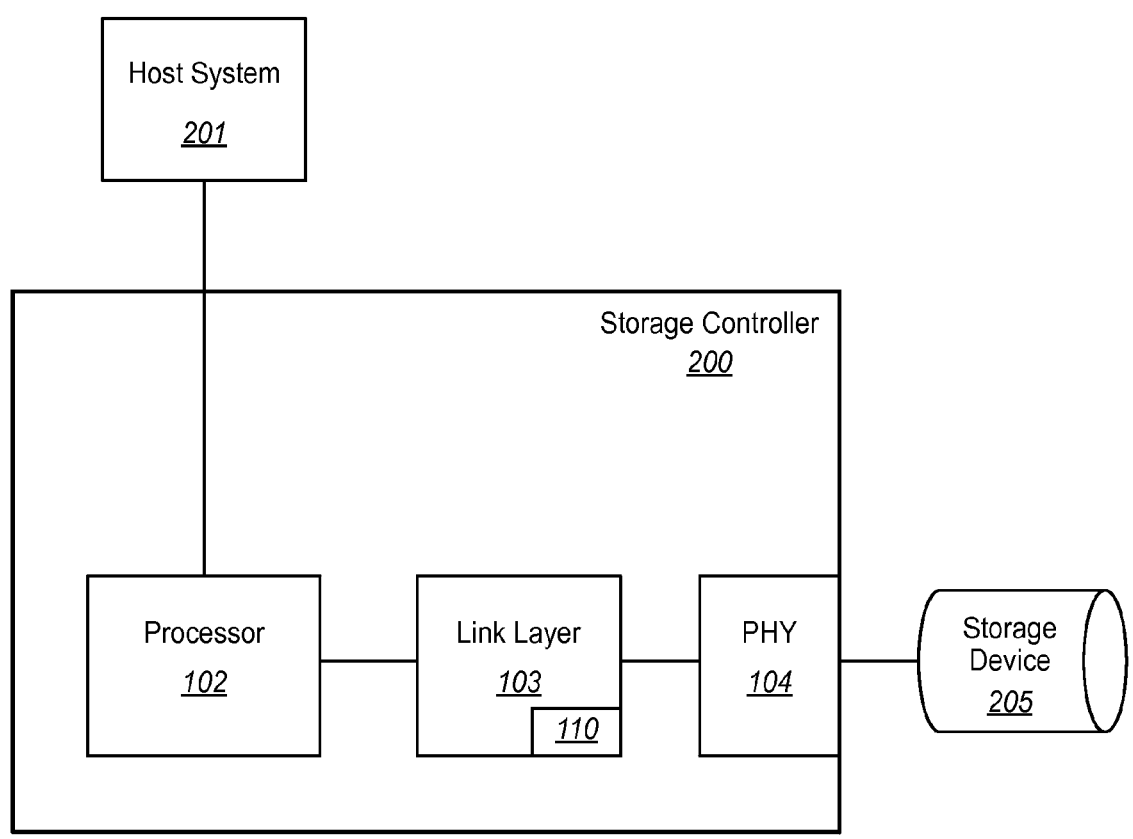
FIG. 2 is a block diagram of an exemplary storage controller enhanced in accordance with features and aspects hereof to provide error recovery.

FIG. 2 is a block diagram of an exemplary storage controller 200 enhanced in accordance with features and aspects hereof to provide error recovery. The storage controller 100 is configured with the processor 102, the link layer 103 and register 110, and the PHY 104 to establish and maintain a connection with a storage device 205. Examples of the storage device 205 include physical storage volumes, storage expanders, Serial Attached Small Computer Systems Interface (Serial Attached SCSI or "SAS") controllers and expanders, and Fibre Channel (FC) controllers and switches, and the like. In one embodiment, the storage controller 200 is a RAID storage controller operable to interface with a plurality of physical storage volumes through a logical volume. Such storage operations are known to those skilled in the art.

SCSI is a set of American National Standards Institute ("ANSI") standard electronic interface specification that allows, for example, computers to communicate with peripheral hardware. Common SCSI compatible peripheral devices may include: disk drives, tape drives, CD drives ("CD-ROM", "CD-RW", etc), DVD drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. SCSI is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface transport media standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands, such as SAS, also used to interconnect networks of storage devices with processing devices. Serial Advanced Technology Attachment ("SATA") is another set of transports and commands used to interconnect networks of storage devices with processing devices. These applications are often referred to as storage networks. Those skilled in the art are familiar with SAS and SATA standards as well as other SCSI related specifications and standards. Information about such interfaces and commands is generally obtainable at the website http://www.t10.org. As used herein, reference to SAS devices and protocols may be understood to include SATA devices and protocols. The problems discussed herein and the solutions provided by this invention are similarly applicable to SATA devices.

Such SCSI storage networks are often used in large storage systems having a plurality of disk drives to store data for organizations and/or businesses. The network architecture allows storage devices to be physically dispersed in an enterprise while continuing to directly support SCSI commands. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets often via one or more SAS expanders. In general, as is common in all SCSI communications, SAS initiators, such as the host system 102, initiate communications with SAS targets, such as the physical storage device 205. The expanders expand the number of ports of a SAS network domain used to interconnect SAS initiators and SAS targets (collectively referred to as SAS devices or SAS device controllers).

In general, a SAS initiator directs information to a SAS target device through ports of one or more SAS expanders in the SAS domain. A "port" in SAS terminology is a logical concept. A port may comprise one or more physical links in a SAS domain, such as the PHY 204.

Figure 3:
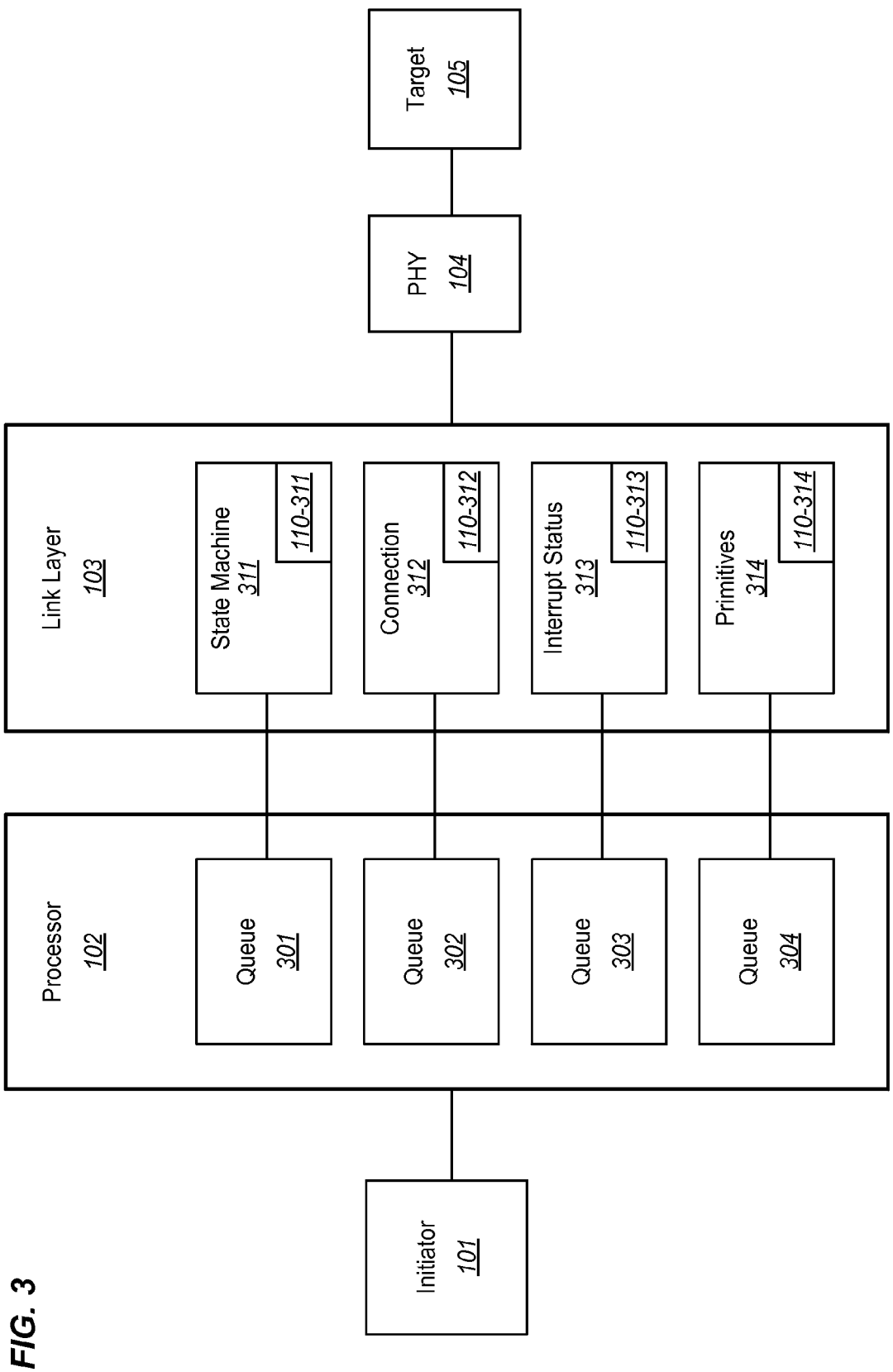
FIG. 3 is a more detailed block diagram of the exemplary hardware controller enhanced in accordance with features and aspects hereof to provide error recovery.

FIG. 3 is a more detailed block diagram of elements of the exemplary hardware controller 100 enhanced in accordance with features and aspects hereof to provide error recovery. In this embodiment, the link layer 103 is configured with a state machine 311, a connection module 312, an interrupt status module 313, and a primitives module 314. The connection module 312 establishes and maintains a connection between the initiator 101 and the target 105. The state machine module 311 latches the current state of the link layer 103 and notes any errors as well as the device originating those errors during the connection between the initiator 101 and the target 105. The interrupt status module 313 maintains the interrupt status of those errors. For example, an error associated with a critical event may be deemed to have a high priority interrupt. Information associated with that high priority interrupt may be maintained by the interrupt status module 313, at least until overwritten by a subsequently detected error.

Each of the modules 311-314 are communicatively coupled to the queues 301-304, respectively, of the processor 102 to receive I/O requests from the queues. For example, a host system, such as the host system 201 of FIG. 2, may request certain information or data pertaining to the state machine 311, the interrupt status module 313, and/or the primitives module 314. The host system may also request data pertaining to the connection with a storage device, such as the storage device 205 of FIG. 2, through the connection module 312. In this regard, the host system 201 may transfer I/O requests to the processor 102 such that the processor 102 may then queue the I/O requests 201 in the queues 301-304 for processing.

When an error occurs during the connection between the initiator 101 and the target 105, the processor 102 is interrupted and the status of that interrupt is recorded in the interrupt status module 313 of the link layer 103. The state machine module 311 determines the device where the error occurred and maintains that information in the current state of the connection between the initiator 101 and the target 105. If the error occurs in the connection itself, the error may be deemed noncritical and thus intervention is deemed unnecessary. For example, the error may be a connection attempt failure which is automatically retried and requires no intervention by the processor 102. However, other errors, such as data transfer errors, may be deemed critical and require intervention.

To ensure that the errors are not overwritten by subsequently detected errors, the link layer 103 stores the information pertaining to the errors in the registers 110 of the modules 311-314. For example, information pertaining to the device where the error occurred may be stored in the register 110 of the state machine 311. The interrupt information of that error may be stored in the register 110 of the interrupt status module 313. In any case, the processor 102 may be able to access the error information in the registers 110 of the modules 311-314 to determine whether a detected error is critical and requires intervention.

The registers 110 of the modules 311-314 may store this error information for recovery by the processor 102 for a certain amount of time or until the registers 110 accumulate a certain number of errors. That is, the link layer 103 generally does not require permanent logging of errors because the processor 102 may be able to address the errors quickly enough. Accordingly, the registers 110 of the modules 311-314 may be configured to store information pertaining to a certain number of errors so as to minimize the storage footprint on the hardware controller 100. In this regard, the registers 110 of the modules 311-314 may be a queue of registered entries so that some number of errors may be accumulated, such as a circular queue or a FIFO. Alternatively or additionally, the processor 102 may be configured to delete the error and its associated information after addressing the error. For example, the processor 102 may retrieve the error information from the link layer 103 and determine that the error is a result of a noncritical event, such as a connection attempt failure. Thereafter, the processor 102 may delete the error information from the link layer register 110 because the information is no longer needed.

Those of ordinary skill in the art will readily recognize numerous additional and equivalent elements that may be present in fully functional systems, such as the systems of FIGS. 1, 2, and 3. Such well known additional and equivalent elements are omitted for simplicity and brevity of this discussion.

Figure 4:
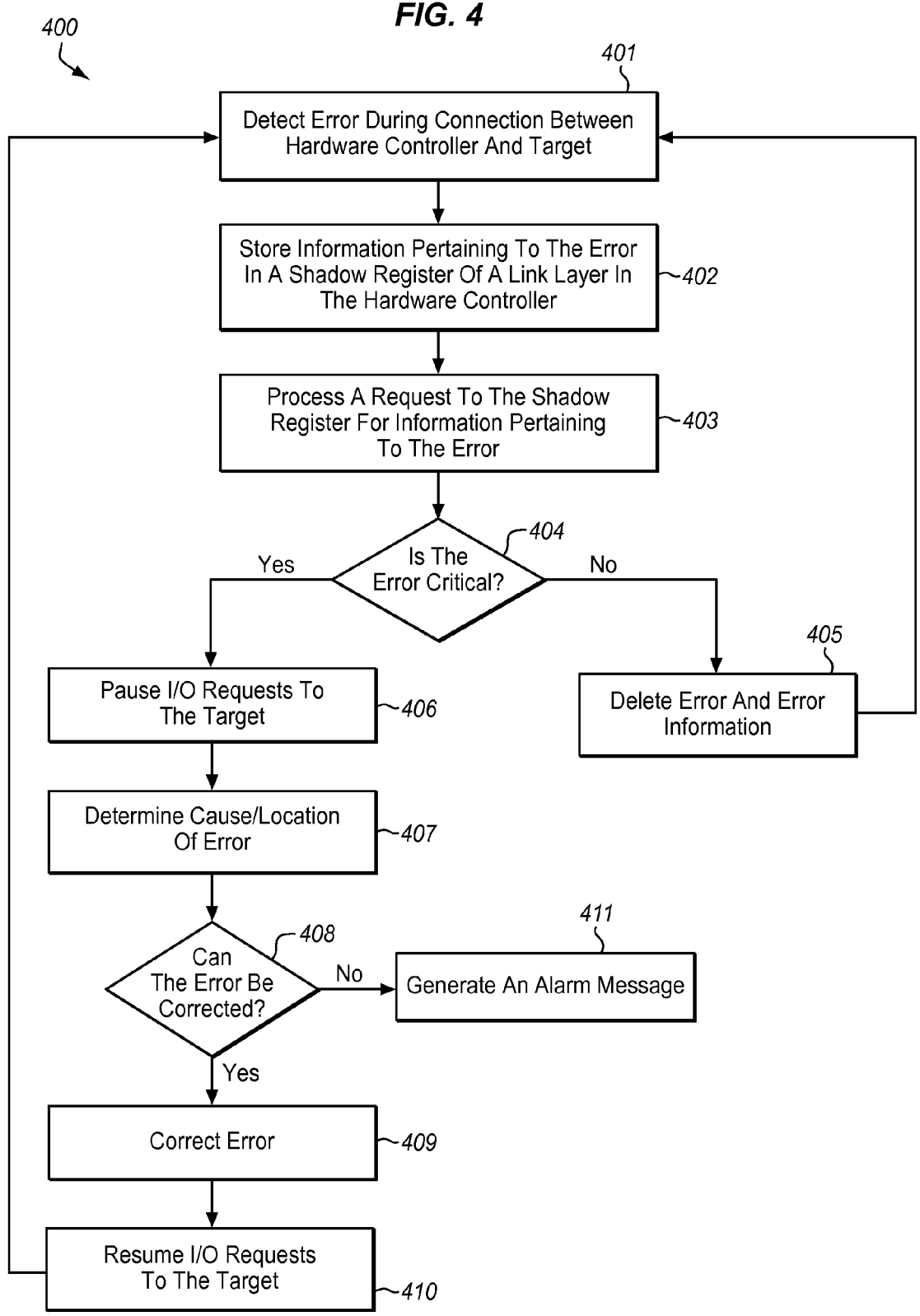
FIG. 4 is a flowchart illustrating an exemplary method in accordance with features and aspects hereof to provide error recovery in a hardware controller.

FIG. 4 is a flowchart 400 illustrating an exemplary method 400 in accordance with features and aspects hereof to provide error recovery in a hardware controller. In this embodiment, a hardware controller, such as that shown and described in FIG. 1 is configured with a link layer that is operable to detect errors during a connection between the hardware controller and the target, in the process element 401. For example, the hardware controller may establish communications between a host system or other initiator and a storage device. Upon detection of a subsequent error during the connection between the hardware controller and the target, the hardware controller will overwrite the error and its associated information. To prevent the loss of information relating to the detected error, the hardware controller stores information pertaining to the error in a shadow register of the link layer in the hardware controller, in the process element 402. For example, the link layer may shadow the error detections and store those errors and the relevant information pertaining to those errors, at least temporarily, until the errors may be addressed, thereby preventing the errors from being overwritten by subsequently detected errors. Thereafter, the hardware controller may process a request to the shadow register for information pertaining to the error, in the process element 403. For example, the processor of the hardware controller may process interrupts according to various priorities, including those pertaining to detected errors. If a higher priority interrupt occurs before the processor is capable of handling the interrupt for the error, the error may be overwritten by subsequent error. The shadow register, in this regard, provides the processor with additional time to handle the interrupt for the error. Accordingly, the processor may access the shadow register after addressing higher priority interrupts so as to address the error of the shadow register. In doing so, the processor may determine whether the error is critical or not, in the process element 404.

If the error is not critical, the processor may delete the error and the error information from the shadow register of the link layer, in the process element 405, and continue monitoring the connection between the hardware controller and the target, in the process element 401 to detect other errors. If the error, however, is critical, the processor may pause I/O requests to the target, in the process element 406, so as to determine the cause/location of the error, in the process element 407. For example, a critical error related to data transfers may result in data corruption of a storage device. Accordingly, the processor may pause the I/O requests to the storage device to prevent data corruption until the error can be corrected. In this regard, the processor may determine whether the error can be corrected without external intervention, in the process element 408. For example, if the processor is capable of handling the error and correcting it without a change in firmware, the processor may do so, in the process element 409, and then resume I/O requests to the target, in the process element 410. Afterwards, the link layer may then return to monitoring the connection between the hardware controller and the target, in the process element 401 to detect other errors. If the error cannot be corrected by the processor, the processor may generate an alarm message for external intervention, in the process element 411. For example, a problem may exist in the firmware of the hardware controller that requires correction. In this regard, the firmware may need to be debugged, and the processor may generate information pertaining to the error such that a host system or other computing system may intervene to debug and correct the firmware.

Those of ordinary skill in the art will readily recognize numerous additional and equivalent processing elements that may be present in a fully operational method such as the method of FIG. 4. Such well known additional and equivalent processing elements are omitted herein for simplicity and brevity of this discussion.

Figure 5:
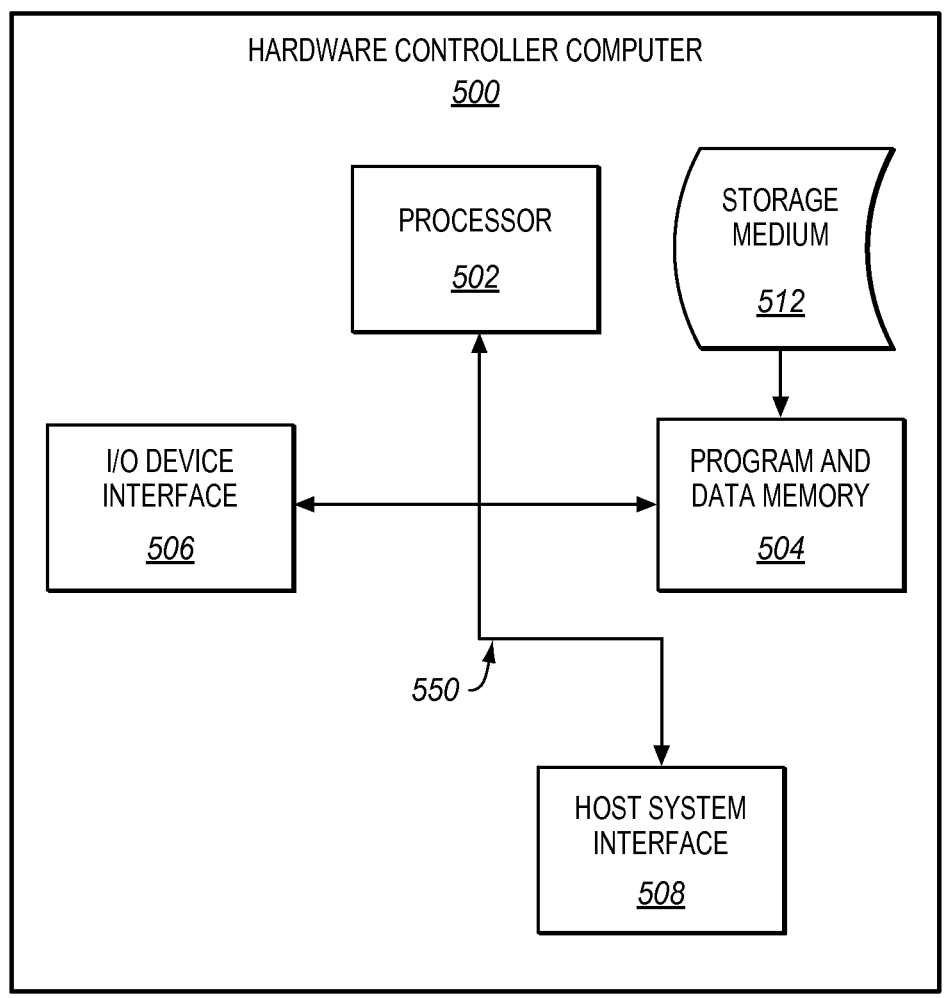
FIG. 5 is a block diagram of a computing system on which a computer readable medium may be used to receive program instructions for implementing methods in accordance with features and aspects hereof.

Embodiments of the invention can take the form of an entirely hardware embodiment, an entirely software embodiment or an embodiment containing both hardware and software elements. In one embodiment, the invention is implemented in software, which comprises but is not limited to firmware, resident software, microcode, etc. FIG. 5 is a block diagram depicting hardware controller computer system 500 adapted to provide features and aspects hereof by executing programmed instructions and accessing data stored on a computer readable storage medium 512 for implementing one or more of the methods depicted herein.

Furthermore, embodiments of the invention can take the form of a computer program product accessible from a computer-usable or computer-readable medium 512 providing program code for use by or in connection with a computer or any instruction execution system. For the purposes of this description, a computer-usable or computer readable medium can be any non-transitory apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The hardware controller computer system 500 being suitable for storing and/or executing program code includes at least one processor 502 adapted to be coupled directly or indirectly to memory elements 504 through a system bus 550. The memory elements 504 can include local memory employed during actual execution of the program code, bulk storage, and cache memories, which provide temporary storage of at least some program code in order to reduce the number of times code must be retrieved from bulk storage during execution.

Front end interfaces 508 and back end interfaces 506 may be coupled to the processor to enable the hardware controller computer system 500 to be coupled with other data processing systems or storage devices through intervening private or public networks. Ethernet cards, Wi-Fi interfaces, Bluetooth Interfaces, are just a few of the currently available types of network or host interface adapters. For example, the back end interfaces 506 may be coupled to a storage device as shown and described in FIG. 2.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A hardware controller, comprising:
a link layer adapted to establish a connection between an initiator and a target and detect errors associated with the connection, wherein each detected error is overwritten by a subsequently detected error;
a processor adapted to transfer input/output requests to the target through the link layer,
wherein the link layer comprises a register adapted to persistently store the detected errors associated with the connection between the initiator and the target for recovery of a detected error after the detected error has been overwritten in the link layer.

2. The hardware controller of claim 1, wherein the processor is further adapted to determine whether a persistently stored error is a connection attempt error or a critical error and to pause input/output requests to the target upon determining that the persistently stored error is a critical error until the critical error is corrected.

3. The hardware controller of claim 1, wherein the processor is further adapted to determine a current state of the connection between the initiator and the target.

4. The hardware controller of claim 1, wherein the target is a data storage device and wherein the link layer establishes the connection to the data storage device via a Small Computer System Interface protocol.

5. The hardware controller of claim 1, wherein the target is a data storage device and wherein the link layer establishes the connection to the data storage device via a Serial Attached Small Computer System Interface protocol.

6. The hardware controller of claim 1, wherein the target is a data storage device and wherein the link layer establishes the connection to the data storage device via a Serial Advanced Technology Attachment protocol.

7. The hardware controller of claim 1, further comprising a physical layer operable to physically couple to the target and to control signaling between the initiator and the target.

8. The hardware controller of claim 1, wherein the register is a first-in-first-out register and wherein the processor is further operable to delete the stored errors after addressing the stored errors.

9. A method of providing error recovery in a hardware controller, the method comprising:
detecting at least two errors associated with a connection between the hardware controller and a target;
storing information pertaining to the errors in a link layer register of the hardware controller;
accessing the link layer register to address the errors; and
deleting the error information of an error in the link layer register in response to addressing the error.

10. The method of claim 9, further comprising determining whether the error pertains to a critical event.

11. The method of claim 10, further comprising, in response to determining that the error pertains to a critical event:
pausing I/O requests to the target; and
determining a cause of the error.

12. The method of claim 11, further comprising:
correcting the error; and
continuing to detect errors during the connection between the target and the hardware controller.

13. The method of claim 9, wherein the target is a data storage device and the link layer establishes the connection to the data storage device via a Small Computer System Interface protocol.

14. The method of claim 9, wherein the target is a data storage device and the link layer establishes the connection to the data storage device via a Serial Attached Small Computer System Interface protocol.

15. The method of claim 9, wherein the target is a data storage device and the link layer establishes the connection to the data storage device via a Serial Advanced Technology Attachment protocol.

16. A non-transitory computer readable medium embodying programmed instructions that, when executed by a processor, cause the processor to perform a method of providing error recovery in a hardware controller, the method comprising:
- detecting at least two errors associated with a connection between the hardware controller and a target;
- storing information pertaining to the errors in a link layer register of the hardware controller;
- accessing the link layer register to address the errors; and
- deleting the error information of an error in the link layer register in response to addressing the error.

17. The computer readable medium of claim 16, further comprising:
- determining whether the error pertains to a critical event.

18. The computer readable medium of claim 17, further comprising, in response to determining that the error pertains to a critical event:
- pausing I/O requests to the target; and
- determining a cause of the error.

19. The computer readable medium of claim 18, further comprising:
- correcting the error; and
- continuing to detect errors during the connection between the target and the hardware controller.

20. The computer readable medium of claim 16, wherein the target is a data storage device and the link layer establishes the connection to the data storage device via a Small Computer System Interface protocol, a Serial Attached Small Computer System Interface protocol, or a Serial Advanced Technology Attachment protocol.

* * * * *